United States Patent
Michel et al.

[15] 3,693,796
[45] Sept. 26, 1972

[54] METHOD AND APPARATUS FOR REMOVAL OF PARTICLES FROM SUSPENSION

[72] Inventors: Bernard Michel, 793 Des Vignes St., St. Foy, Quebec; J. Allison Delaney, 625 Milton St., Montreal, Quebec, both of Canada

[22] Filed: Aug. 21, 1969

[21] Appl. No.: 851,963

[52] U.S. Cl. .................................. 210/84, 210/170
[51] Int. Cl. ............................................. B01d 21/00
[58] Field of Search ........ 210/170, 154, 155, 156, 83, 210/84, 115, 98, 74, 221, 259, DIG. 21; 61/2, 220, 221; 209/156, 157

[56] References Cited

UNITED STATES PATENTS

| | | | |
|---|---|---|---|
| 3,469,402 | 9/1969 | Lowd | 210/DIG. 21 |
| 3,353,679 | 11/1967 | Hirsch | 210/259 |
| 2,590,756 | 3/1952 | Colin et al. | 209/156 X |
| 2,825,691 | 3/1958 | Fischer | 210/221 X |
| 2,728,457 | 12/1955 | Clarke | 210/74 |
| 3,494,475 | 2/1970 | Hedstrom et al. | 209/157 X |

*Primary Examiner*—Reuben Friedman
*Assistant Examiner*—T. A. Granger
*Attorney*—Lawrence I. Field

[57] ABSTRACT

Method and apparatus comprising an intake of bridge pier like concrete construction for water-works located in a flowing stream of water. The intake has a passage leading from a submerged inlet upstream to upper and lower downstream outlets. The passage widens in a vertical plane from the inlet towards the outlets and has a shape to cause the overall velocity of the stream to be slowed and the upper part to move faster than the lower part thereby to entrain frazil ice or other particulate material entering the passage and to carry it through the upper outlet while water free from such material passes through the lower outlet. Means is provided for injecting air near the inlet to form a curtain of air bubbles to further slow down the stream and to enhance the differential velocity between its lower and upper parts.

13 Claims, 8 Drawing Figures

INVENTORS
Joseph Allison DELANEY
Bernard MICHEL

*Alan Swabey*

ATTORNEY

INVENTORS
Joseph Allison DELANEY
Bernard MICHEL

ATTORNEY

METHOD AND APPARATUS FOR REMOVAL OF PARTICLES FROM SUSPENSION

This invention relates to the removal of particulate foreign matter from flowing liquid.

When an open body of shallow water (river, stream or lake) is subjected to freezing temperatures and the flow is relatively fast, the water loses heat by evaporation to an extent that super-cooling occurs resulting in the formation of small crystals of ice of various shapes and sizes normally termed "frazil ice." Due to the high flowing velocity of the water, the frazil ice remains in a near homogeneous solution because of turbulence, eddy current, etc. in the main body of water and usually enters intakes as frazil slush. Frazil slush is a concentrated or coherent form of frazil ice. Similarly, other suspended material also tends to enter the intake as a homogeneous suspension into which it is formed by turbulence.

The problem of removing frazil slush has long plagued municipalities and industry and has not been solved. It is an aim of this invention to provide means for removing frazil slush and other suspended solids at water intakes.

At the present state of the art of intake design, for example, a pipeline or tunnel is extended from shore, terminating by an intake in the stream or having a fixed structure projecting either below or above the water surface. Such intakes are provided with racks and intercept trash, including frazil slush and other particulate material.

The present invention provides a method and apparatus that is primarily intended to remove trash in the form of ice particles or other suspended materials, automatically, by hydraulic means. The device takes the form of a solid structure, preferably of reinforced concrete, placed in the path of a stream of water and provided with a passage leading from an entrance below water level to separate lower and upper outlets, the former for water freed from entrained material, the latter for water carrying material removed from the stream. The entrance is designed to provide for the entry of a given volume and velocity of water dependent on the desired flow. The configuration of the passage is such that it has a floor and a roof which diverge so as to increase the cross-sectional area and decrease the flow velocity. The floor diversion angle is such that under hydraulic operating conditions, minimum velocity is attained, dependent on the material to be removed. The diversion angle of the roof is related to hydraulic requirements to maintain a continuous velocity field, such that the upper portion of the flow continues at an almost constant velocity and leaves through the downstream outlet. The flow velocity is induced by virtue of the venturi effect of the flowing stream of water passing downstream behind and at each side of the structure or, alternately, in the case of a dam, by the flow of the exit water caused by the pull of gravity. By virtue of this design, the material particles in the stream going through the passage, because of the decreased velocity in the lower section, will rise and be carried out by the higher velocity of the flow in the upper section and will pass out through the upper outlet. Water, freed from suspended materials, will pass to the lower outlet to the place of its intended use.

The invention will be described in more detail by reference to the accompanying drawings which illustrate preferred embodiments and in which.

Figure 1:
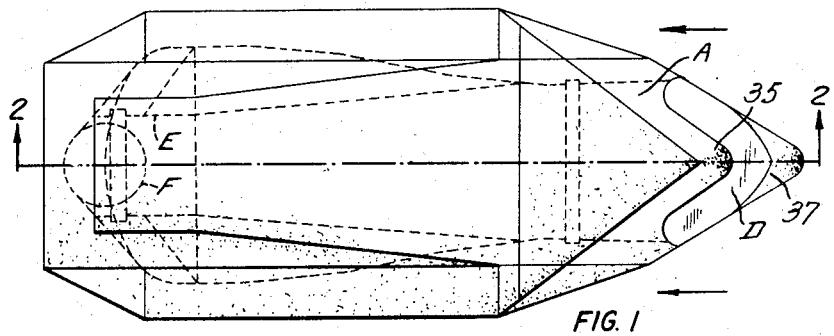
FIG. 1 is a plan view of a typical intake structure of a water supply system.
Figure 2:
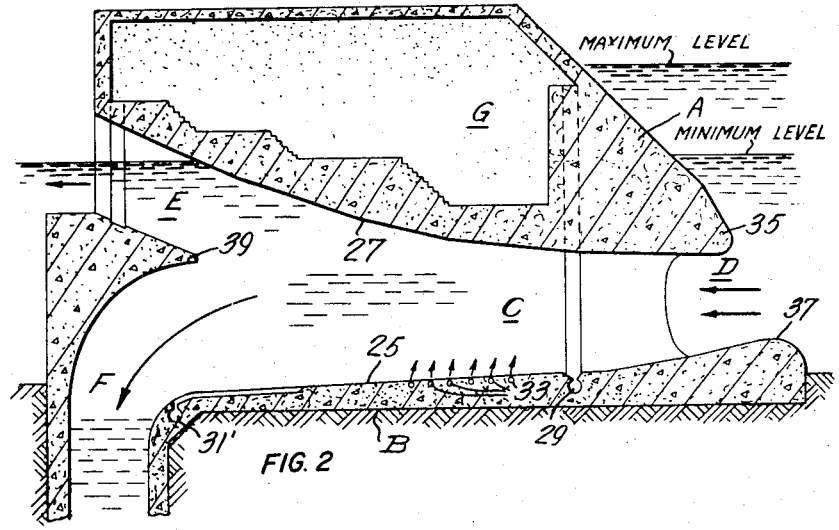
FIG. 2 is a vertical cross-section along the line 2—2 of FIG. 1.
Figures 3, 4:
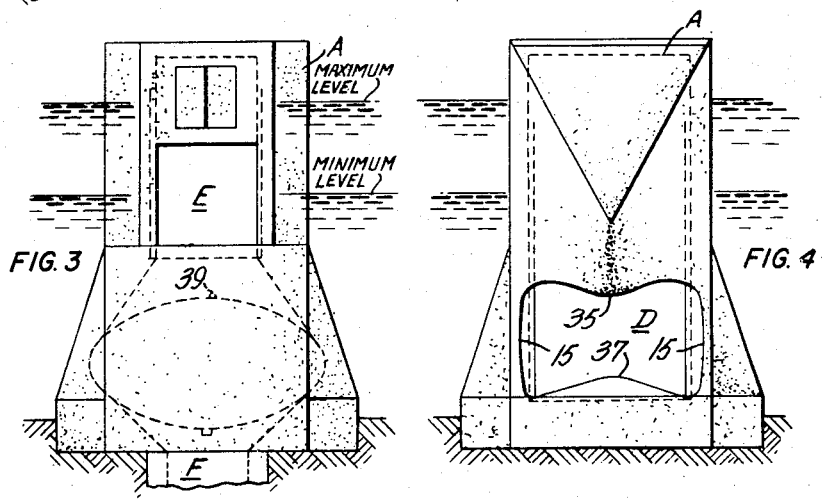
FIG. 3 is a rear elevation of the intake shown on the previous figures.
FIG. 4 is a front elevation of the intake shown on the previous figures.

Referring more particularly to FIGS. 1 to 4, one specific form of municipal water intake structure is shown as a casting A of concrete. The casting A is partly embedded in and rests on the bed B of a moving body of water. The casting A is provided with a passage C which leads from an inlet or mouth indicated generally as D to two outlets indicated as E and F respectively. The casting is also provided with access space G which can house control apparatus.

The particular shape of the mouth D and the passage C in the prototype shown can be seen in the drawings. In longitudinal vertical cross-section, the mouth D gives somewhat the impression of a fish mouth being provided with a prominently projecting lower jaw 37 and spaced above it an upper jaw 35 which does not project so far. The jaws 35 and 37 are thus spaced apart both in the horizontal as well as the vertical plane and their surfaces and an extension thereof across the mouth would form an ice breaker nose.

The mouth D has lips 15 which extend inwardly and downwardly between the jaw 35 and the jaw 37. The jaw 35 also projects downwardly and the jaw 37 upwardly to form a restricted opening at the middle of the mouth D. The shape of the passage C gradually changes in cross-section from the mouth D until it becomes substantially an oval near the entrance of the outlets E and F as shown in dotted lines in FIG. 3.

The passage C has a floor 25 which slopes gradually downwards toward the outlet F. The passage C has a ceiling 27 which slopes upwards to outlet E. The floor may be provided behind the entrance D with a sand or gravel trap 29 and close to the outlet F with a sand trap 31.

Sunk into the floor 25 are a number of spaced-apart headers 33 provided with orifices opening into the passage C from which air can be emitted.

A splitter projection 39 or so-called splitter is provided between the outlets E and F, functioning to split the stream between these two outlets.

The headers 33 are pipes which extend transversely of the floor 25 and have a surface exposed on the surface of this floor. These pipes are connected to an apparatus, not shown, including an air saturation tank and a pump which pumps water and entrained air to the tank to provide a saturated solution of air and water. This saturated solution is pumped into the headers 33 and released to their orifices into the passing stream. As the air saturated water is released from the headers 33 the pressure is reduced and consequently the air is released into the stream as fine air bubbles.

OPERATION

The operation of the intake shown in FIGS. 1 to 4 is as follows. The water from the stream flows into the mouth D with entrained frazil slush and any other suspended materials there may be. The speed at which the water enters the passage C is dependent on how much is taken off at F and E respectively. In one application dealing with frazil slush, the speed at the inlet is about 2½ feet per second. Because of the shape of the mouth D and the passage C the velocity is reduced along the bottom surface or floor 25 to four-tenths of a foot per second in this particular application relating to frazil slush. When the water hits the mouth D, the flow is faster in the higher parts near the side walls 15 and faster between the protruding jaws 35, 37. In other words, the construction in the middle causes the water to flow faster than it does at the sides.

As the slope of the floor 25 starting at the lip 37 changes, the velocity of the water adjacent to the floor 25 reduces. At the same time, the water near the ceiling 27 tends to maintain its velocity because it travels directly to and through the outlet E from which it is sucked by the surrounding stream of the flowing water, which can be that of a river or discharged by the pull of gravity in the case of a dam. As the water passes along the floor over the headers 33, air is released from these headers 33 into the water which becomes entrained with the frazil slush and suspended material, rendering the ice and material more buoyant. This buoyancy causes the solids to rise toward the surface and to be carried out with the faster moving water leaving the outlet E downstream. The water underneath, freed from frazil slush and other suspended materials, flows down through the outlet F.

Meanwhile, the traps 29 and 31, if present, trap gravel and said brought in by the stream. The traps 29 and 31 are evacuated by hydraulic means, as well understood. The jaws 35 and 37 divert chunks of ice flowing in the stream.

In this particular installation, which is illustrated by way of example, the size of the mouth is roughly 50 feet wide by 12 feet high and the length of the passage between the front of the mouth to the splitter 39 is about 100 feet (the drawing being out of proportion).

The special shape contour of the passage accomplishes good separation from the entering stream of frazil slush and other suspended material, without the injection of air. Air injection is an added optional feature.

An alternate form of intake is shown in FIGS. 5 through 8. To facilitate reference to the various parts they have been numbered with tens and digits the same as in FIGS. 1 to 4 but raised by one hundred and with the parts shown by letters, the letters are the same but have been shown with a prime sign.

In this form of the invention, the upper lip 135 protrudes beyond the lower lip 137. In the form of device shown in FIGS. 1 to 4, the water lever is always well above the bottom of the lip 135 and the top of this lip 135 slopes upwards for the purpose of diverting ice over its top as well as to each side. In the construction shown in FIGS. 5 and following, the nose of the inlet D' formed by the lips 135 and 137 is designed rather to divert ice to either side of the structure. The lower lip 137 has a vertical front face to prevent rocks from jumping the lip into the passage 115.

Figure 5:
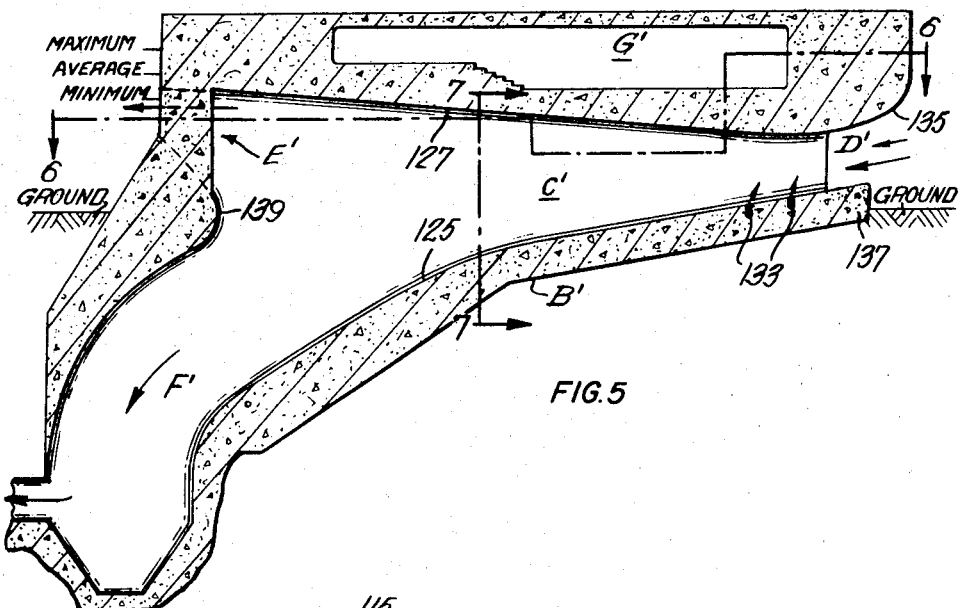
FIG. 5 is a vertical cross-section through another typical intake structure for water-works.
Figure 6:
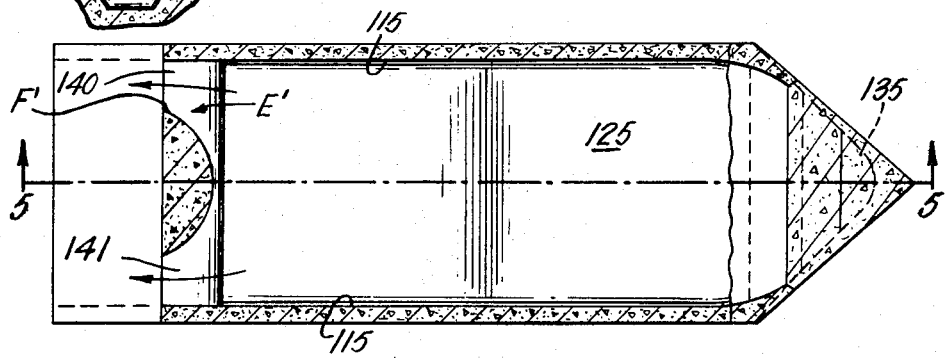
FIG. 6 is a vertical cross-section along the line 6—6 of FIG. 5.
Figure 7:
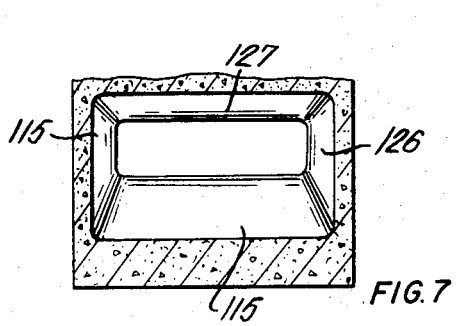
FIG. 7 is a rear elevation of the intake shown in FIGS. 5 and 6.
Figure 8:
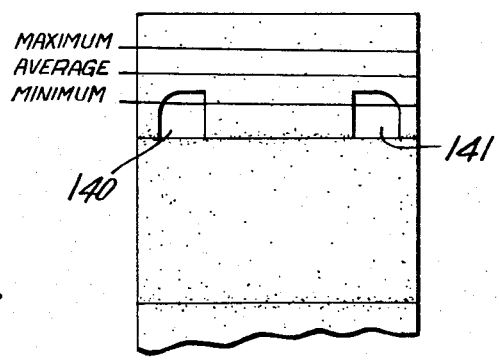
FIG. 8 is a front elevation of the intake shown in FIGS. 5, 6 and 7.

The cross-section of the passage from inlet D' towards the outlets E', F' is nearly rectangular, as shown in FIG. 7, with the side walls vertical and a fillet between the side walls and the roof 137 and floor 125. The angle of inclination of the floor 125 is not more than about 7 degrees to the horizontal near the inlet but increases sharply around the mid-point of the floor 125 and the angle of inclination of the ceiling from the horizontal is from about 1 degree to about 5 degrees. A splitter 139 would also be provided between the outlets E' and F' in the manner as illustrated in FIG. 5 to split the stream between these two outlets E' and F'.

The outlet E' is preferably divided into two separate passages 140 and 141 formed in the end wall 144 and having the contour shown.

In the particular form shown in FIGS. 5 to 8, the sand traps shown in FIGS. 1 to 4 have been eliminated. Heavy solids like sand and gravel will pass down along the floor into the outlet F' where they can be collected by a conventional trap in the bottom of a vertical pit, while the feed water is drawn off through a horizontal tunnel having its entrance above the bottom of the pit.

In this form of the invention there are spaced-apart headers 133 provided with air openings. The headers 133 run from side to side along the floor 125, as shown, leading to the passage 115 and adapted to jet air into the water from the floor 125. The headers 133 are fed from a suitable source of air under pressure. The headers 133 have spaced-apart openings, from which air, from a suitable source of compressed air, is released, to form curtains of bubbles.

The water intake shown is essentially an ice flotation device without mechanical parts. The elimination of the ice starts even before the water enters the intake at D'. The upper part of the entrance opening is situated 10 feet lower than the lowest water level, so that the floating icicles, breaking drift ice, a good part of the snow slush and compact flakes of frazil are brushed to one side on the surfaces in front of the entrance. Also, there is considerable slowing of the speed of flow before the entrance where the speeds change from 6 or 7 feet per second to 2 or 3 feet per second at the entrance. This accentuates the process of external removal of the compact flakes of frazil which are located at a lower level.

In the interior of the passage C' the flow diverges progressively over a length of approximately 150 feet. The speeds are reduced by more than half and the flakes of frazil float towards the ceiling of the intake. Further, the active frazil which has been able to gain entrance, has time to develop stable crystals which are no longer adhesive when they reach the opening of the vertical intake channel.

The two openings 140 and 141 act as hydraulic aspirators, 10 feet by 10 feet, in this example, to permit the maintaining of higher speeds at the top of the interior passageway so as to aspirate and evacuate the frazil at the downstream end of the intake.

During this time the part of the flow used would be 350 million gallows per day, split towards the horizontal entry of the outlet F'. The speeds are in principle reduced to less than 1 foot a second and the flakes of frazil cannot sink into the outlet F'.

The curtain of air injected into the channelway near the entry of the intake through the headers 133 is made up of bubbles which vary in diameter from micron size and upwards and have the following effects. They can adhere to and float relatively big submerged material, but their principal role is to create a curtain of bubbles which slows the speed of the lower part of the flowing water, and accelerates the upper part, to facilitate still more the flotation of the frazil.

Heat may be used as a supplementary factor in order to obtain a further safeguard against ice accumulation. The natural heat of the earth may be harnessed by locating the entrance of the tunnel about 100 feet below the bed of the river. At this depth the temperature of the rock is in the neighborhood of 44° F during the winter.

However, to take care of the extremely improbable eventuality of a sizable deposit of ice on the interior walls of the intake, radiant heating may be installed on the walls at the most exposed places, near the entrance.

The lower lip of the entrance at the front nose of the intake is elevated 4 feet above the bed of the river so as to prevent large rocks from entering into the intake. If, by chance, gravel and sand or both is entrained in the intake, it will deposit at the bottom of the vertical shaft leading from F'. The entrance of the water supply tunnel is situated above the bottom of this shaft and leads laterally from its wall. A sediment pump may be used as required for periodically removing gravel and sand deposits from the bottom of the shaft.

EXAMPLE

The following is an example of a typical inlet construction according to the invention. The inlet structure is substantially as shown in FIGS. 5 to 8 similar to a bridge pier and its passage has a length of, from entrance D' to outlet E', 150 feet, a width between the side walls 115 or 50 feet and a height of around 12 feet at the inlet and is made of reinforced concrete. The construction was accomplished similarly to constructing a bridge pier by building a coffer dam in a stream to form an enclosure. The water was removed and the bed excavated to provide a receiving cavity in which forms were placed and concrete poured in the usual manner to provide the structure. Once the concrete had set the forms were stripped.

The coffer dam was then removed. The stream then both flowed around the structure and entered the inlet, as shown in the drawings. One billion gallons a day flowed into the inlet. Entrained in the water entering the inlet at winter temperatures was a maximum of about 4 percent by volume of frazil slush. Air was injected through two headers spaced apart as shown at 133 in FIGS. 5 to 8 each extending the whole width of the floor and having openings about one-sixteenth of an inch in diameter spaced 1 foot apart. There were 45 orifices of both headers. There was a total discharge from the orifices of both headers of 34 cubic feet per minute of air.

The amount of water leaving the outlet F' was approximately 350 million gallons per 24 hour day. The amount leaving the outlet E' was approximately 650 million gallons per 24 hour day. The velocity of the water was 3 feet per second near the entrance D' and 1 foot per second on the floor as it approached the outlet F' and about 6 feet per second near the outlet E'. No substantial amount of frazil slush was entrained in the stream passing through the outlet F'. (End of example.)

The specific installations shown and described are by way of example and are adapted to specific conditions. It will be understood, of course, that the exact construction for a given installation may vary within the spirit of the invention, depending on requirements in terms of volume of water, depth of water, velocity, conditions in the stream, and the amount of ice and other debris to be removed.

While the structure has been shown as forming a part of a water-works water intake, the same principle may be applied to a continuous structure, for example a dam intake to turbines. In a dam, the outlet E' would lead to the overflow at the crest of the dam, and, the passage F' would lead to a turbine. The suction applied to the water at E' would then result from the force of gravity acting on the water falling over the crest of the dam. The amount of water lost, flowing through E', is a relatively small portion of the amount going through F'. The devices of the invention can operate with varying water levels and varying volumes and rates of flow.

We claim:

1. An apparatus to be positioned in a body of flowing liquid for separating finely divided solids entrained in the flowing liquid, said apparatus comprising a structure having a passage defined by an upper wall, a lower wall and a pair of spaced-apart side walls, an inlet in said structure leading downstream into said passage, said inlet being at least below the surface of a body of liquid from which finely divided solids are to be separated, said upper wall having portions narrowing from said inlet to said outlet, said lower wall having portions widening from said inlet to said outlet, said side walls having portions widening in their vertical plane from said inlet to said outlet, said structure having upper and lower vertically spaced-apart outlets in communication with said passage downstream of said inlet, said upper outlet being adjacent said upper wall and communicating with the body of flowing liquid, and said outlet being adjacent said lower wall whereby a differential flow velocity is established between the liquid discharging from said upper and lower outlets for discharging the entrained solids through said upper outlet and discharging generally solid free liquid through said lower outlet, and splitter means in said passage between said outlets for splitting the differentially flowing liquid between the upper and lower outlets.

2. The apparatus of claim 1 further characterized in that the upper wall portion diverges upwardly at an angle such that the upper strata flow continues at an almost constant velocity.

3. The apparatus of claim 1 further characterized in that the lower wall portion diverges downwardly at an angle such that under hydraulic operating conditions a minimum flow velocity is achieved.

4. The apparatus of claim 1 further characterized in that the spaced-apart side walls are substantially non-divergent.

5. The apparatus of claim 1 further characterized in that the finely divided solids are frazil ice and the stream of liquid is water.

6. The apparatus of claim 1 in which means is provided for injecting air from the lower wall near the inlet to form a curtain of bubbles rising through the liquid in the passage adapted to assist flotation of the finely divided solids.

7. The apparatus of claim 1 in which the downward slope of the lower wall is greater in zones downstream of the mid point of the passage than zones upstream thereof.

8. The apparatus of claim 1 in which the splitting means comprises a tapered baffle projecting upstream to orient the upper and lower strata between the respective upper and lower outlets.

9. An installation for freeing a body of flowing liquid of finely divided solids entrained in the flowing liquid, comprising, an apparatus located in the bed of a body of flowing liquid, said apparatus comprising a structure having a passage defined by an upper wall, a lower wall and a pair of spaced-apart side walls, an inlet in said structure leading downstream into said passage, said inlet being at least below the surface of a body of liquid from which finely divided solids are to be separated, said upper wall having portions narrowing from said inlet to said outlet, said lower wall having portions widening from said inlet to said outlet, said side walls having portions widening in their vertical plane from said inlet to said outlet, said structure having upper and lower vertically spaced-apart outlets in communication with said passage downstream of said inlet, said upper outlet being adjacent said upper wall and communicating with the body of flowing liquid, and said outlet being adjacent said lower wall whereby a differential flow velocity is established between the liquid discharging from said upper and lower outlets for discharging the entrained solids through said upper outlet and discharging generally solid free liquid through said lower outlet, and splitter means in said passage between said outlets for splitting the differentially flowing liquid between the upper and lower outlets.

10. The installation of claim 9 wherein the body of flowing liquid is a natural body of water and the finely divided solids generally comprise ice particles.

11. A method of substantially separating finely divided solids entrained in a body of flowing liquid comprising the steps of: reducing the overall velocity of at least a portion of said liquid by introduction of said portion of said liquid into a submerged inlet of a structure having a passage defined by an upper wall, a lower wall and a pair of spaced-apart side walls, and a plurality of downstream outlets, establishing a differential velocity between upper and lower strata of said portion of said liquid due to said upper wall having portions narrowing from said inlet to said outlets, said lower wall having portions widening from said inlet to said outlets, said side walls having portions widening in their vertical plane from said inlet to said outlet, said side walls having portions widening in their vertical plane from said inlet to said outlets wherein the velocity of the upper strata exceeds the velocity of the lower strata whereby entrained solids are substantially concentrated in the upper strata; discharging said concentrated entrained solids containing strata back into said body of flowing liquid; and passing the lower substantially entrained solids free strata to a point of use.

12. The method of claim 11 including the step of injecting a gaseous phase-containing fluid into said portion of said liquid during said step of reducing the overall velocity of said portion of said liquid to form a curtain of bubbles rising through the liquid to assist the flotation of the finely divided entrained solids into the upper stratum.

13. The method of claim 11 wherein said flowing liquid is water and said entrained solids generally comprise ice particles.

* * * * *